J. WASH.
Bee Hive.
No. 77,139. 
Patented April 21, 1868.
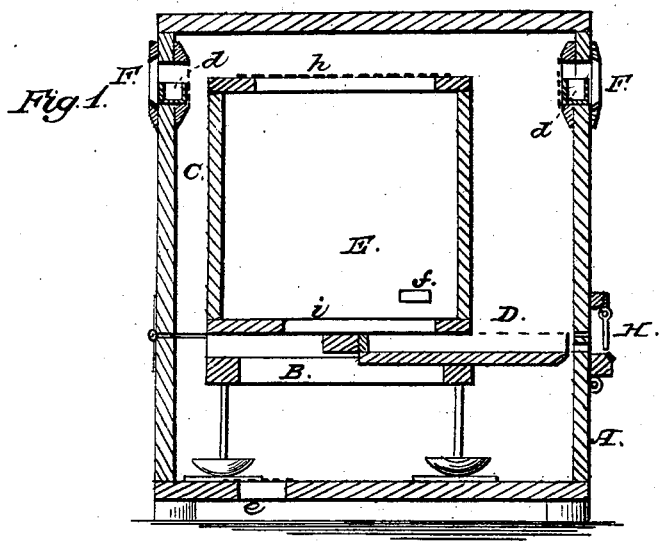
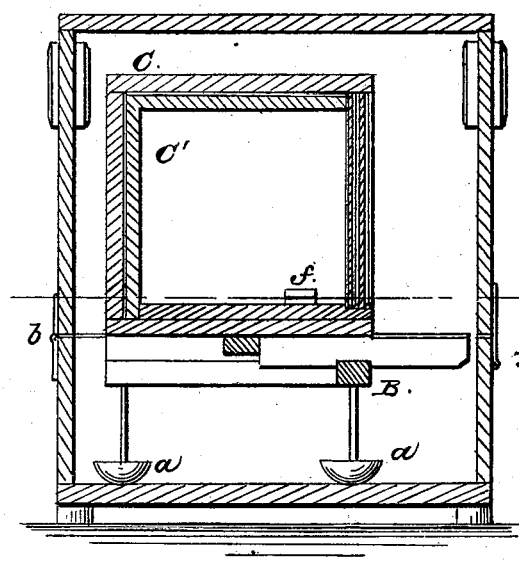
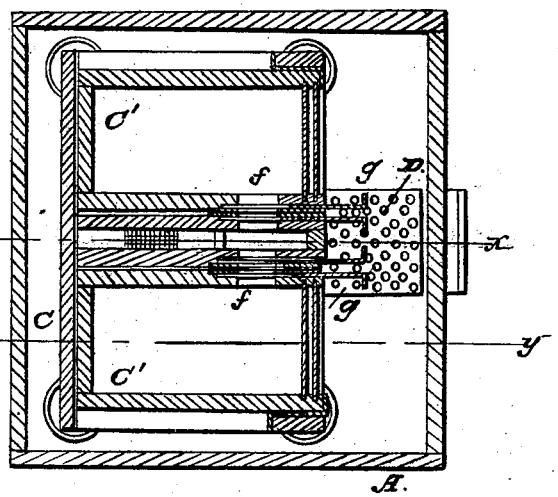

United States Patent Office.

JAMES WASH, OF MOUNT STERLING, ILLINOIS.

Letters Patent No. 77,139, dated April 21, 1868.

IMPROVEMENT IN BEE-HIVE.

*The Schedule referred to in these Letters Patent and making part of the same.*

TO ALL WHOM IT MAY CONCERN:

Be it known that, I JAMES WASH, of Mount Sterling, in the county of Brown, and State of Illinois, have invented a new and useful Improvement in Bee-Hives; and I do hereby declare that the following is a full, clear, and exact description thereof, which will enable others skilled in the art to make and use the same, reference being had to the accompanying drawings, forming part of this specification, in which—

Figure 1 represents a sectional elevation of my improved bee-hive, on the line $x\ x$ of fig. 3.

Figure 2 represents a sectional elevation of the same on the line $y\ y$ of fig. 1.

Figure 3 represents a horizontal section on the line $z\ z$ of fig. 2.

Similar letters of reference indicate like parts.

The nature of my invention relates to improvements in bee-hives, the object of which is to provide a hive that shall effectually prevent millers, moths, and other insects from entering the same, and at the same time provide a hive having good ventilation, and which is easy of access to remove the boxes of honey; and it consists in arranging an outer housing, which may be of sufficient size to contain as many separate hives as may be desired; the hives being arranged within the said outer covering, to stand on legs, the lower ends of which sit within vessels containing oil or other fluid, which will prevent any attempt of the moths to climb the said legs, and provided with a passage into them, the communication of which, with the opening through the outer building, is broken by a space which will be sufficient to cause the moths to fall down to the bottom of the said outer building, in their attempts to pass into the passage of the hives provided for the bees, the said space being made too small for the bees to pass through it. The said passage is also made of considerable length, and perforated so as to prevent the emission of the odor of the honey or bees, the said perforation allowing the odor to be carried off within the outer box, by a current of air, which is caused by openings made for the purpose, through the outer building, near the top of the same, which openings are provided with troughs to contain oil or other fluid, into which the millers will fall in their attempts to make the passage through the said openings, where they are attracted by the odor which passes out of them. The said opening for the passage of the bees is also protected by an automatic protector.

A represents an outer housing, within which the hives may be arranged in a row on the bench B, the legs of which stand in vessels $a\ a$, containing any suitable fluid that will prevent moths or other insects from climbing the legs. No other part of the bench or hives comes in contact with any portion of the outer casing, whereby crawling insects are cut off from access to the hives. The said outer housing A is made of two parts, and hinged together at $b$, so that the top portion may swing off from the hives to afford access to them. The hives may be made of a long box, $c$, and divided at suitable intervals into spaces or stalls, which are open on the front side, into which the honey-boxes C may slide. D represents a passage for the bees to enter and leave the boxes, which passage opens into a vertical space, E, formed in the partitions which divide the long box C into stalls for the honey-boxes, from which space are openings into the boxes on each side of it, near the bottom of the same. Communicating with the said space E are openings through the bottom and top of the box C, protected by screens, whereby a passage for air is provided, to admit the proper circulation. The passage D extends toward the wall of the housing A, which has an opening corresponding with it, and terminates a short distance from the same, so as to leave a space, the width of which does not admit the passage of bees, but will be sufficient to cause moths or other crawling insects to fall, in their attempts to enter the hives, into the space below. The top wall of the said passage D is perforated, whereby it is designed that the odor arising from the bees or honey may not be emitted from the mouth of the passage of the bees, but will rise upward by means of a current of air entering the said passage. F F represent passages near the top of the outer building, within which outer wall of the building are arranged vessels for containing water or any other suitable liquid, which will destroy the lives of such flying insects, as millers, that may fall into the said vessels in their attempts to enter these passages, to which they are allured by the odor passing out of the same, by reason of the current of air generated by the heat of the bees within the hive, and assisted by the colder air rushing in at the mouth of the passage D, and also through any other openings in the bottom of the house, as at $e$. $ff$ are the passages through the sides of the hives, communicating with the space E between the hives, into which the passage D leads. These passages $f$ may be closed, as desired, by the slides $g$, when it is necessary to withdraw the hives to remove the honey or from any other reason. $h\ i$ are the ventilating-passages in the top and bottom of the box C, communicating with the spaces E in the partitions between the hives, and are covered by screens. H represents an automatic self-adjusting guard, attached to the front side of the house, before the opening in the same to the passage D, which is made of wires, suspended from a horizontal wire secured in a frame, so arranged with reference to the said opening that the lower ends of the wires may be easily pushed away by the bees in entering or leaving the hive, but which are not easily moved by millers in their attempts to enter.

By the use of hives constructed as hereinbefore described, it will be perceived that very great obstacles are presented to the efforts of millers or moths to enter the same. Inasmuch as the millers are attracted to the hive by the odor arising therefrom, they will most naturally seek admission through the passage F, where the odor is emitted from the hive, but if occasionally one may succeed in passing the water-vessel, it cannot possibly enter the hives; and although it may deposit eggs within the house, the moths would first, after hatching, be found upon the floor, from which they cannot ascend into the hive, by reason of the vessels $a$.

Any attempts of moths to enter by the passage D from the outside of the house A, would fail, by reason of the space between the side of the house and the end of the passage D, as hereinbefore described.

Having thus described my invention, I claim as new, and desire to secure by Letters Patent—

The combination of the box C, provided with partitions having spaces E, and passages $h\ i$, with the hives C′, substantially as and for the purpose described.

1. The combination, with the box C and hives C′, of the perforated passage D and outer housing A, substantially as and for the purpose described.

2. The combination, with the box C and hives C′, of the perforated passage D and outer housing A, and the self-adjusting guard H, substantially as and for the purpose described.

3. The combination, with the hives C′ and long perforated passage D, of an outer housing, provided with the odor-passages F, substantially as and for the purposes described.

4. The above specification of my invention signed by me, this seventeenth day of February, 1868.

JAMES WASH.

Witnesses:
 WM. L. TAYLOR,
 JOHN KENDRICK.